United States Patent [19]
Bock et al.

[11] Patent Number: 5,802,228
[45] Date of Patent: Sep. 1, 1998

[54] OPTICAL PACKAGE WITH REMOVABLE FIBER TERMINATION

[75] Inventors: Timothy P. Bock, Greenwich Township, Berks County; Timothy Butrie, Orefield, Lehigh County; Ghazi Mohamed Chaoui, Macungie, Lehigh County, all of Pa.

[73] Assignee: Lucent Technologies Inc., Murray Hill, N.J.

[21] Appl. No.: 767,011

[22] Filed: Dec. 16, 1996

[51] Int. Cl.[6] .................................................. G02B 6/36
[52] U.S. Cl. ...................................... 385/78; 385/92
[58] Field of Search .............................. 385/60, 78, 88, 385/89, 92–94

[56] References Cited

U.S. PATENT DOCUMENTS

| | | | |
|---|---|---|---|
| 4,268,115 | 5/1981 | Slemon et al. | 385/88 |
| 4,547,039 | 10/1985 | Caron et al. | 385/88 |
| 4,690,494 | 9/1987 | Hirose et al. | 385/60 |
| 5,151,961 | 9/1992 | Hvezda et al. | 385/60 |
| 5,608,829 | 3/1997 | Oda et al. | 385/92 X |

OTHER PUBLICATIONS

Pigtail Connection/Removal Tool User's Manual, CEM-53-1478, NEC Corporation, Dec. 6, 1985, 5 pp.

*Primary Examiner*—John D. Lee
*Attorney, Agent, or Firm*—Lester H. Birnbaum

[57] ABSTRACT

Disclosed is an optical component package which permits easy insertion and removal of an optical fiber termination. The termination is inserted through an aperture of a package wall and is retained within the package by a retaining clip which engages the inner surface of the wall. The termination can be removed by removal of the clip, or, in alternative designs, by a rotation of the clip.

12 Claims, 5 Drawing Sheets

5,802,228

1

OPTICAL PACKAGE WITH REMOVABLE FIBER TERMINATION

FIELD OF THE INVENTION

This invention relates to optical component packages, and in particular, to packages which permit easy insertion and removal of optical fiber terminations.

BACKGROUND OF THE INVENTION

Typical optical component packages comprise a laser and/or photodetector mounted on a substrate, usually silicon, along with a lens. This subassembly is mounted within a package which typically comprises metal or ceramic. The package wall includes an aperture which permits an optical fiber termination including an optical fiber and ferrule to be mounted to the package and aligned with the subassembly. A key ingredient in the cost of fabrication of the package is how efficiently the fiber termination can be inserted and aligned. In some applications, it is also desirable to remove the terminations in the event there is some quality problem with the subassemblies. In such cases, it is also desirable to quickly and easily remove the terminations, preferably without the need for a special tool.

In a package sold by NEC under the designation Flat Pack, the fiber terminations include a U-shaped spring clip and spring mounted to the ferrule. Most of the spring clip remains outside the package, but has ends which engage an inner surface of the aperture to hold the termination in place while compressing the spring to hold the termination in axial alignment with the subassembly. (See NEC Publication CEM-53-1478 dated Dec. 6, 1995) While adequate, such a termination tends to be difficult to handle robotically. Further, removal of the termination requires a special tool.

SUMMARY OF THE INVENTION

The invention is an optical component package which includes an aperture in a wall of the package for insertion of an optical fiber termination therein. The fiber termination includes an optical fiber, a ferrule surrounding the fiber, and a spring surrounding a portion of the ferrule. The package further comprises a retaining clip located between the spring and an inner surface of the wall which includes the aperture. The retaining clip has at least one dimension greater than a dimension of the aperture so as to engage the inner surface of the wall and thereby maintain the portion of the ferrule within the package.

BRIEF DESCRIPTION OF THE DRAWING

These and other features of the invention are delineated in detail in the following description. In the drawing.

2

Figure 6:
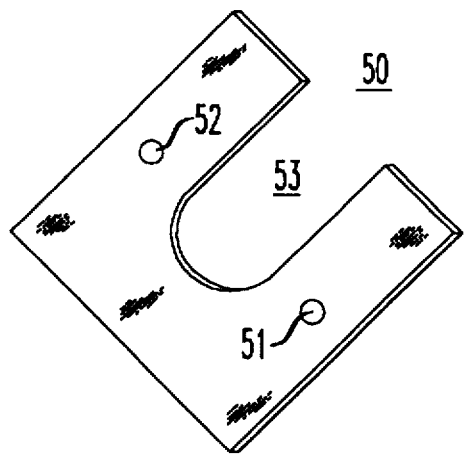
FIG. 6 is a frontal view of a clip in accordance with a still further embodiment.
Figure 8:
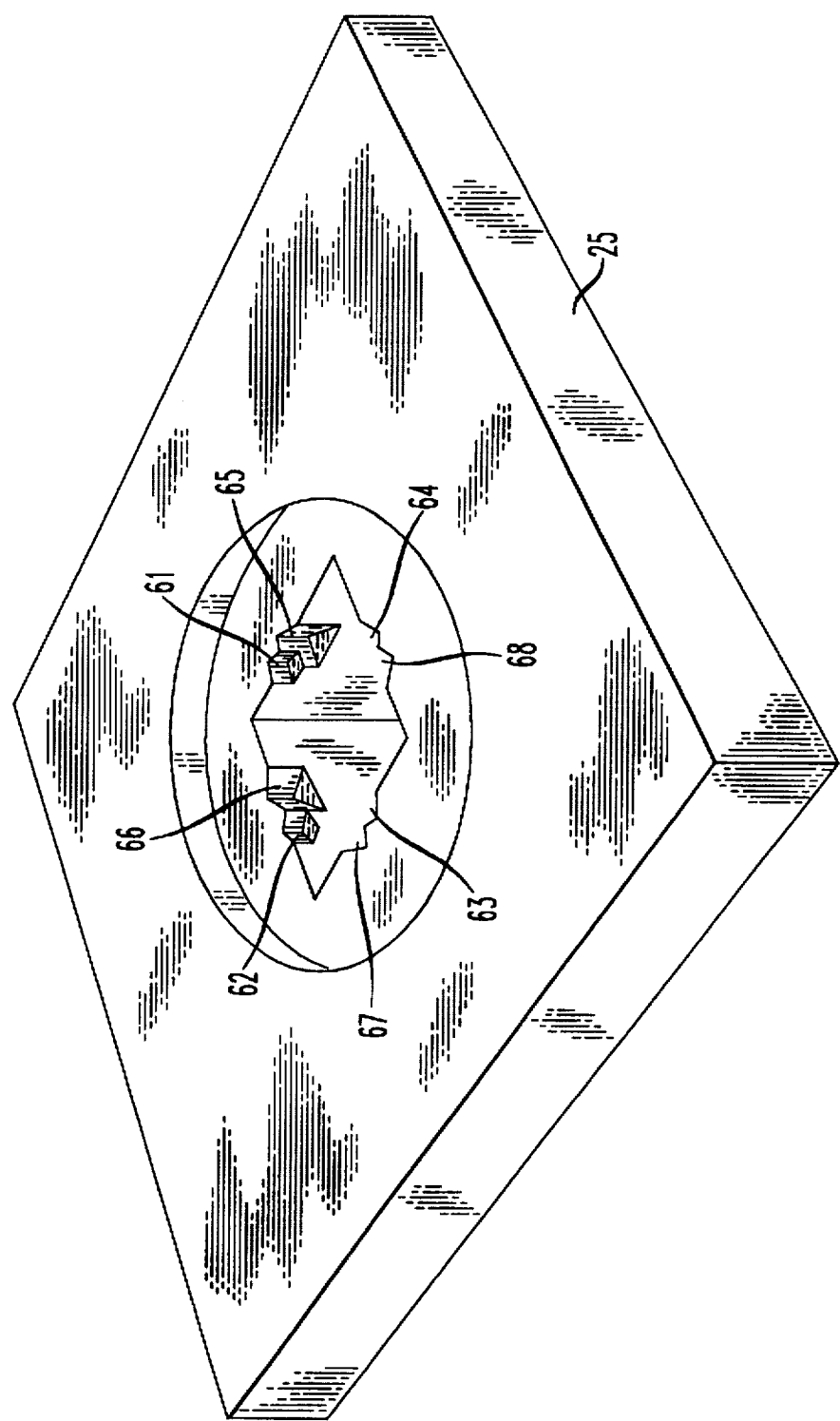

FIG. 8 is a perspective view of an inside surface of a wall of the package incorporating the clip of FIG. 6.

It will be appreciated that, for the purposes of illustration, these figures are not necessarily drawn to scale.

DETAILED DESCRIPTION

Figure 1:
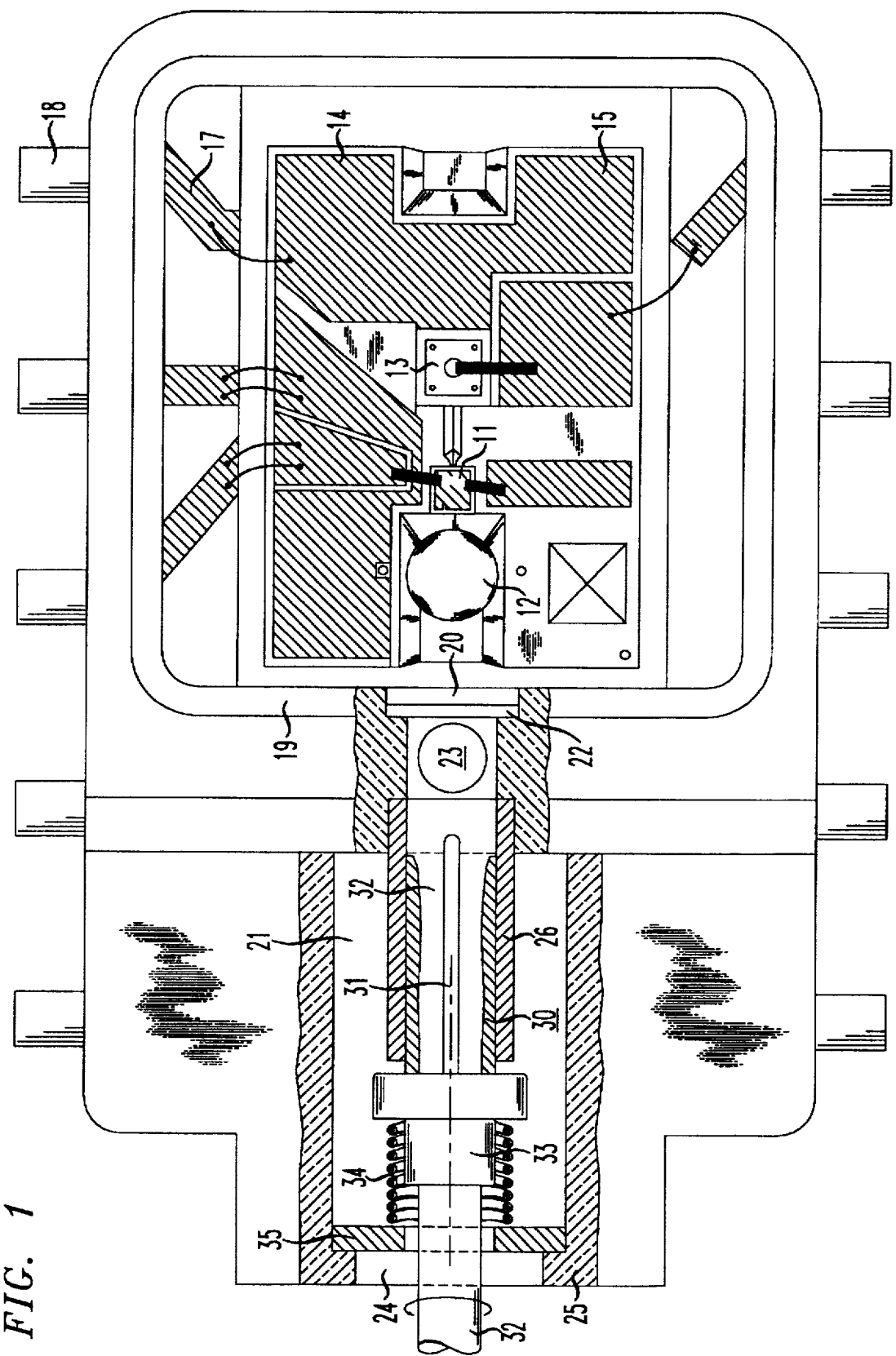
FIG. 1 is a top view, partly cut away and in cross-section, of a package in accordance with an embodiment of the invention.
Figure 2:
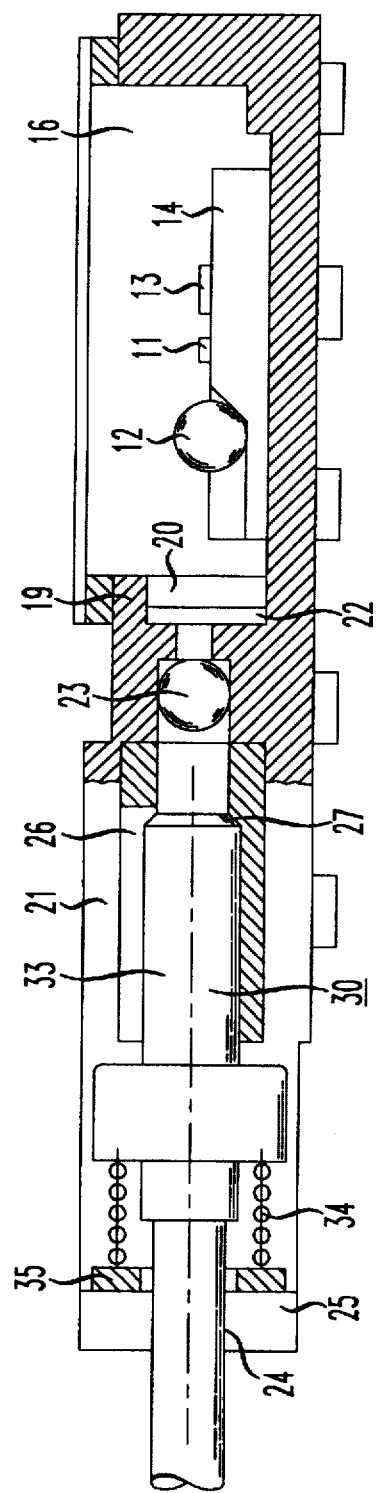
FIG. 2 is a side view, partly cut away and in cross-section, of the package depicted in FIG. 1.
Figure 3:
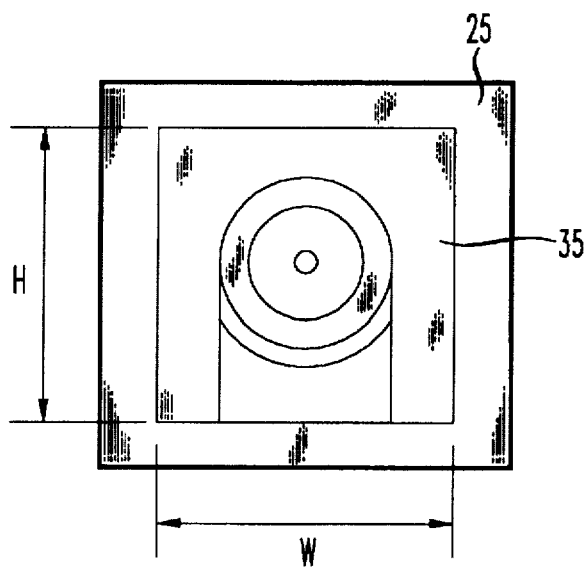
FIG. 3 is an end view of the package shown in FIGS. 1 and 2.

Referring now to the drawings, in which like reference numerals identify similar or identical elements, FIGS. 1, 2, and 3 illustrate a package in accordance with an embodiment of the invention. The package, 10, includes a typical optical subassembly comprising a semiconductor laser, 11, a spherical lens, 12, for focusing light emitted from the laser, 11, and a photodiode, 13, for monitoring the light emitted from the back face of the laser, 11. The components, 11–13, are mounted on a silicon substrate, 14, which includes on the surface a layer of metallization, 15, patterned to provide electrical contact to the laser and photodiode. The subassembly is mounted within a cavity, 16, in the package, and the contact metallization, 15, is wire bonded to metal, e.g., 17, formed on ledges in the cavity so that electrical contact to the outside world is provided through pins, e.g., 18, extending from the side walls of the package.

One end wall, 19, of the cavity, 16, includes an aperture, 20, which communicates with a housing, 21, for receiving an optical fiber termination, 30, to be described. The aperture, 20, can include a further component such as an optical isolator, 22. The housing, 21, includes at the end nearest the cavity, 16, an additional spherical lens, 23, for focusing light onto the optical fiber termination, 30. The housing, 21, extends from the aperture, 20, in the cavity, 16, to another aperture, 24, in an end wall, 25, of the package. The housing, 21, further includes a sleeve, 26, which extends from the lens, 23, to about the center of the housing, 21. The sleeve, 26, includes a shoulder portion, 27, toward the forward end of the sleeve. The aperture, 24, sleeve, 26, and housing, 21, are sized to permit insertion therein of the optical fiber termination, 30.

Figure 4:
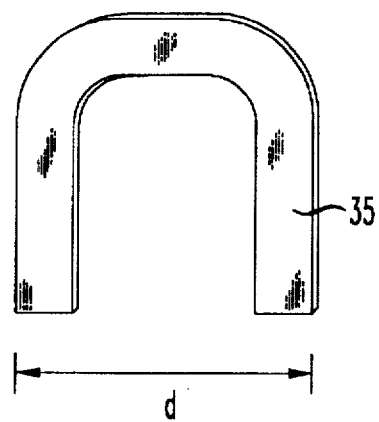
FIG. 4 is a frontal view of a clip in accordance with the same embodiment.

The optical fiber termination, 30, includes an optical fiber having a core, 31, and a surrounding cladding, 32. The fiber is inserted into a standard ferrule, 33, which includes portions of relatively small and large diameters. Positioned behind the large diameter portion is a spring, 34. A retaining clip, 35, is provided between the spring, 34, and the end wall, 25, of the package. In accordance with one embodiment of the invention, as more clearly seen in FIGS. 3 and 4, the retaining clip can be an essentially u-shaped or c-shaped clip with a width dimension, d, which is greater than the width, w, of the aperture, 24.

Thus, the fiber termination, 30, in accordance with this embodiment can be inserted into the package by inserting the fiber-ferrule-spring assembly into the aperture, 24, and applying pressure to the spring, 34. The forward progress of the ferrule, 33, will be stopped by the shoulder portion, 27, and further pressure on the assembly will cause the spring, 34, to compress. Alternatively, the end of the sleeve, 26, can be used as a stop against the large diameter portion of the ferrule. Once sufficient space is produced between the spring, 34, and the end wall, 25, the retaining clip, 35, is inserted through the top of the package. Since the dimension, d, of the clip is larger than the width, w, of the aperture, 24, the fiber termination will remain in place. When it is desired to remove the termination, the clip, 35, is removed, and the fiber-spring-ferrule assembly is withdrawn from the housing, 21, through the aperture, 24. Thus, no special tool is required for removal of the fiber termination.

Figure 5:
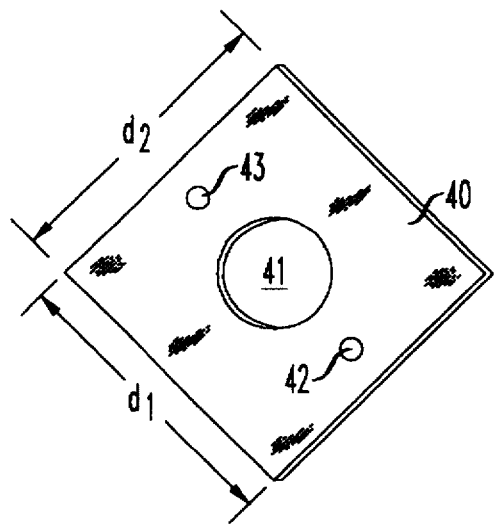
FIG. 5 is a frontal view of a clip in accordance with an alternative embodiment.

In accordance with another embodiment of the invention, the retaining clip, 35, can be a permanent part of the fiber termination, 30, and be formed into the shape illustrated in FIG. 5. Rather than being u-shaped, this clip, 40, is preferably rectangular, with a hole, 41, in the middle through which the optical fiber (core, 31 and cladding 32) is threaded. The clip also includes tabs, 42 and 43, or other similar features on at least one surface. The width is a dimension, $d_1$, which is less than the width, w, of the aperture,24, and the height is a dimension, $d_2$, which is less than the height, h, of the aperture,24. The clip, 40, could be attached to the rearward end of the spring, 34, but is capable of being rotated about the optical fiber by means of a tab (not shown) on the clip around which the spring is snap fit.

Thus, a fiber termination using the clip, 40, of FIG. 5, could be inserted into the aperture, 24, of FIGS. 1 and 2, using a robot arm (not shown) which is attached to the tabs, 42 and 43. The clip is initially in a position where the dimension, $d_1$, is parallel to the width, w, dimension of the aperture, and the dimension, $d_2$, is parallel to the height dimension, h, of the aperture so that the clip can pass through. Once the termination is properly positioned in the housing, 21, and sleeve, 26, the clip, 40, can be rotated, for example, to the position shown in FIG. 5, so that the corners of the clip now engage the inner surface of the cavity wall, 25. In this locked position, the clip will retain the termination in place. When it is desired to remove the termination from the cavity, the clip is merely rotated back to its initial position so that the clip and termination can pass through the aperture, 24. It will be appreciated that although the clip, 40, in FIG. 5 is shown as rotated approximately 45 degrees from its initial position, other angles are possible as long as a portion of the clip engages the wall, 25. Further,the clip can also have a square configuration and operate in essentially the same way. (The square being considered a special case of a rectangular configuration.)

Figure 7:
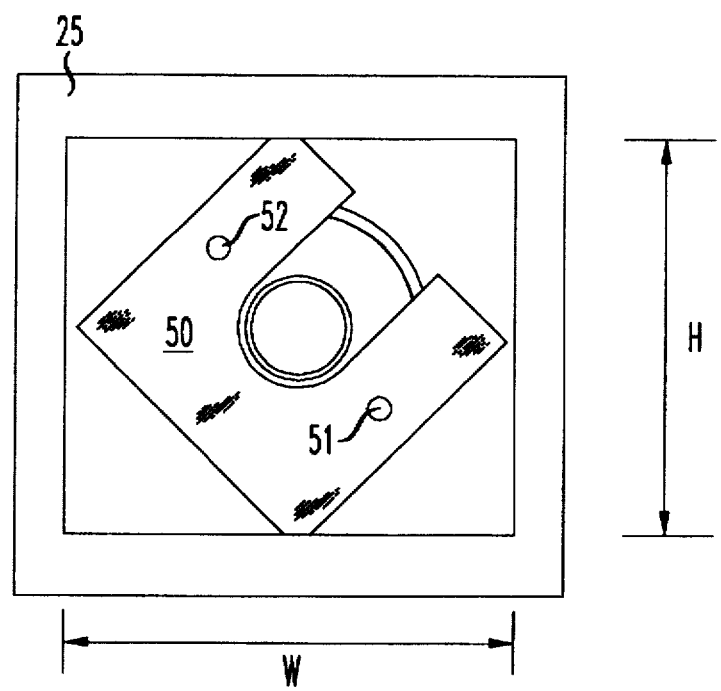
FIG. 7 is an end view of a package incorporating the clip of FIG. 6.

FIG. 6 illustrates a still further embodiment, where the clip, 50, is again intended for attachment to the spring, 34 of FIGS. 1 and 2, and, again, includes tabs, 51 and 52, for attachment of a robot arm (not shown). Here, however, the center hole has been replaced by a slot, 53 so that the clip is c-shaped or u-shaped as in the example of FIGS. 3 and 4. This clip acts in essentially the same manner as the clip shown in FIG. 5, by rotating the clip after insertion in the housing, 21, so that the clip engages the wall, 25, as shown in FIG. 7. The advantage of the design of FIG. 6 is that the clip can be used in combination with a wall, 25, which has a nonplanar inner surface such as illustrated in FIG. 8. That is, the wall, 25, can include a series of steps (e.g., 61–68) which are engaged by the corners of the clip, 50, depending upon the degree of rotation of the clip after insertion in the cavity, 21. Thus, the compression of the spring, 34, can be adjusted by the rotation of the clip. For example, the corners of the clip can engage the steps 65–68 to produce one compression and then rotated to engage the steps 61–64 to further compress the spring.

Various modifications of the invention will become apparent to those skilled in the art. For example, although the invention has been described in terms of a transmitter package, it is applicable to other optical packages, such as receivers. All such variations which basically rely on the teachings through which the invention has advanced the art are properly considered within the scope of the invention.

The invention claimed is:

1. An optical component package comprising:
   an end wall of the package including an aperture formed therein;
   an optical fiber termination inserted through said aperture, said termination comprising an optical fiber, a ferrule surrounding the fiber, and a spring surrounding a portion of the ferrule; and
   a retaining clip located between the spring and an inner surface of the end wall, said clip having at least one dimension which is greater than a dimension of the aperture so as to engage the inner surface and thereby maintain the portion of the ferrule within the package while no portion of the clip extends beyond the end wall of the package.

2. The package according to claim 1 wherein the clip is u-shaped and has a width which is greater than a width of the aperture.

3. The package according to claim 1 wherein the package further comprises a cavity adjacent to the wall for receiving the optical fiber termination and a sleeve within the cavity for receiving the ferrule, the sleeve including a shoulder portion at a forward end thereof for providing a stop for the ferrule.

4. The package according to claim 1 further comprising an optical subassembly within the package and aligned with the optical fiber termination.

5. An optical component package comprising:
   a wall including an aperture formed therein;
   an optical fiber termination inserted through said aperture, said termination comprising an optical fiber, a ferrule surrounding the fiber, and a spring surrounding a portion of the ferrule; and
   a retaining clip located between the spring and an inner surface of the wall wherein the clip has a height and width which are less than a corresponding height and width of the aperture to permit insertion of the clip through the aperture in a first orientation, but said clip having a diagonal which is greater than either the height or width of the aperture so that the clip maintains the ferrule within the package when the clip is rotated to a second orientation.

6. The package according to claim 5 wherein the clip is rectangular and includes a hole therein for insertion therethrough of the optical fiber.

7. The package according to claim 5 wherein the clip includes at least one tab on a surface thereof.

8. The package according to claim 5 wherein the clip is u-shaped.

9. The package according to claim 5 wherein the clip is attached to the spring.

10. The package according to claim 5 wherein the inner surface of the wall includes a series of steps which are engaged by the clip depending upon the degree of rotation of the clip.

11. The package according to claim 5 wherein the package further comprises a cavity adjacent to the wall for receiving the optical fiber termination and a sleeve within the cavity for receiving the ferrule, the sleeve including a shoulder portion at a forward end thereof for providing a stop for the ferrule.

12. The package according to claim 5 further comprising an optical subassembly within the package and aligned with the optical fiber termination.

\* \* \* \* \*